US008713567B2

(12) United States Patent
Gehrmann

(10) Patent No.: US 8,713,567 B2
(45) Date of Patent: Apr. 29, 2014

(54) METHOD FOR SWITCHING BETWEEN VIRTUALIZED AND NON-VIRTUALIZED SYSTEM OPERATION

(75) Inventor: Christian Gehrmann, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 209 days.

(21) Appl. No.: 13/070,958

(22) Filed: Mar. 24, 2011

(65) Prior Publication Data

US 2012/0246641 A1 Sep. 27, 2012

(30) Foreign Application Priority Data

Mar. 22, 2011 (WO) .................. PCT/SE2011/050312

(51) Int. Cl.
*G06F 9/455* (2006.01)

(52) U.S. Cl.
USPC ............................................................ 718/1

(58) Field of Classification Search
None
See application file for complete search history.

(56) References Cited

U.S. PATENT DOCUMENTS

| | | | | |
|---|---|---|---|---|
| 6,272,637 | B1* | 8/2001 | Little et al. | 713/194 |
| 7,483,370 | B1* | 1/2009 | Dayal et al. | 370/219 |
| 2004/0025045 | A1* | 2/2004 | Chan | 713/200 |
| 2005/0223225 | A1* | 10/2005 | Campbell et al. | 713/166 |
| 2008/0184373 | A1 | 7/2008 | Traut et al. | |
| 2009/0100250 | A1* | 4/2009 | Chen et al. | 712/43 |
| 2009/0241189 | A1* | 9/2009 | Shanbhogue et al. | 726/23 |
| 2009/0287571 | A1 | 11/2009 | Fujioka | |

FOREIGN PATENT DOCUMENTS

WO 2010010258 A2 1/2010

OTHER PUBLICATIONS

Written Opinion issued in International application No. PCT/SE2011/050312 on Dec. 9, 2011, 5 pages.

* cited by examiner

*Primary Examiner* — Gregory A Kessler
(74) *Attorney, Agent, or Firm* — Rothwell, Figg, Ernst & Manbeck, P.C.

(57) ABSTRACT

A method performed by an embedded system controlled by a CPU and capable of operating as a virtualized system under supervision of a hypervisor or as a non-virtualized system under supervision of an operating system, is provided. The embedded system is executed in a normal mode if no execution of any security critical function is required by the embedded system, where the normal mode execution is performed under supervision of the operating system. If a security critical function execution is required by the embedded system, where protected mode execution is performed under supervision of the hypervisor, the operating system is switching execution of the embedded system from normal mode to protected mode, by handing over the execution of the embedded system from the operating system to the hypervisor, and when execution of the security critical function is no longer required by the embedded system is switched from protected mode to normal mode, under supervision of the hypervisor.

17 Claims, 9 Drawing Sheets

METHOD FOR SWITCHING BETWEEN VIRTUALIZED AND NON-VIRTUALIZED SYSTEM OPERATION

TECHNICAL FIELD

The invention refers to a method for enabling virtualization on a system comprising one or more CPUs, a computer program to execute such a method, and a computer program product comprising such a computer program.

BACKGROUND

Security has become a major differentiator when it comes to the design of various types of consumer electronics, such as e.g. mobile and smart telephones, media players, residential gateways, as well as various types of networked sensors. Similarly, different kinds of embedded systems are used for controlling various types of security critical functions applied in both mobile and fixed networks, in vehicles and in control systems, such as e.g. power plant control systems.

Security concerns for embedded systems may range from reliability, requiring e.g. a high uptime, a robust execution and a reliable network access, to a high protection from software attacks, including e.g. viruses and Trojans.

What is currently experienced could be referred to as a boost in the embedded software domain with respect to the number of services and usage of open software. However, open software platforms and operating systems also give more freedom and power to fraudulent attackers, especially since source code documentation and common hacking tools are becoming more and more accessible. Today we therefore also see a boost in exposure to mobile viruses and network attacks, especially targeting mobile devices and sensitive infrastructure embedded devices. One could therefore expect an even increased threat to all types of embedded systems in the future.

Moreover, large open software systems subject to frequent updates are increasingly being expected to run on various types of embedded devices. In order to better protect such systems, there is a strong need for partitioning in order to isolate security critical functions or services from non-security critical functions/services, as well as for providing for a reliable monitoring of secure system properties.

Virtualization is a technology where the use of a hypervisor, which may alternatively be referred to as a Virtual Machine Monitor (VMM), enables embedded devices not only to consolidate hardware and scale capacity to meet varying loads but also to host one or more Operating Systems (OS) and accompanying software stacks.

In addition, a hypervisor is, when run at the most privileged execution level on a device and with the help of basic hardware protection mechanisms which are normally available on most platforms, providing a powerful approach to both secure isolation for security critical data associated with security critical functions and monitoring of the security critical functions. As a hypervisor typically has full control of memory usage and access to hardware resources on a platform, on which it resides, it has the ability to isolate security critical functions, running as what is typically referred to as virtual machines, from non-security critical functions. Furthermore, a hypervisor can make sure that non-security critical functions do not get access to sensitive memory regions or hardware peripherals. In addition, a hypervisor typically also has full control of all information that is allowed to flow between secure and non-secure execution domains on a platform.

Virtualization obtained through the usage of hypervisors is an old technology which, after having been almost abandoned during 1980s and 1990s, was rediscovered when virtualization by binary translation was introduced by VMware. More information on virtualization and virtual platforms can be found at www.vmware.com, available 2011 Mar. 17.

In the context described below virtualization technology is to be referred to as an approach where a complete software system, including an OS, runs on top of a hypervisor, giving the illusion to a guest system of actually running directly upon the real hardware. Such a virtualization application is often also referred to as a system virtualization.

Virtualization can be achieved by using a hypervisor with different approaches, such as e.g. binary translation, hardware-assisted virtualization based on the x86 architecture, enabling multiple OSs to simultaneously share x86 processor resources in a safe and efficient manner, or paravirtualization, where the actual guest code is modified to enabling use of a different interface that is either safer or easier to virtualize and/or that improves performance. Currently, advanced hardware support for virtualization is still lacking in most embedded architectures, thereby making paravirtualization or binary translations the most viable approaches of virtualization. Well known examples of virtualization solutions for embedded systems include Red Bend Softwares Hypervisor, available at www.redbend.com 2011-03-17 and OKL4 secure kernel, available at www.ok-labs.com/products/okl4-microvisor 2011-03-17. System virtualization is also described in J-Y Hwang et al. "Xen on ARM:System Virtualization using Xen Hypervisor for ARM-based Secure Mobile Phones",$5^{th}$ IEEE Consumer Communications and Network Conference.

In none of the examples given above a hypervisor has been introduced purely for security purposes, but rather for more general purposes, providing possibilities to run legacy software on new hardware and/or the possibility of running several OSs in parallel on the same hardware.

A related but different approach, compared to pure virtualized technologies, is the ARM TrustZone technology, available at—www.arm.com/products/processors/technologies/trustzone.php, which describes a solution suitable for ARM11 and ARM Cortex embedded processors. TrustZone offers support for creating two securely isolated virtual cores, or "worlds", on a single real core, where one world is considered to be Secure, while the other world is Normal. TrustZone manages transitions between these worlds through hardware interrupts and a so called "monitor" mode, which prevents a present state or data from leaking from the Secure world to the Normal world. System hardware, including memory and peripherals, can be allotted to each world.

The security advantages realized by introduction of a hypervisor to the embedded system mentioned above come with the cost of performance penalties. Advanced hardware virtualization support or extensive use of paravirtualization may reduce the performance penalties, but not completely remove them. However, due to efficient software porting requirements, it is appreciated if paravirtualization can be avoided to as large extent as possible. Similarly, even with advanced hardware virtualization, the performance penalties might be unacceptable. In particular, this is a considerable problem in tiny embedded systems having very limited capacity. On the other hand, security critical functions are typically not running continuously, but are often only needed occasionally to perform one or more critical tasks on the system. It is therefore a desire to limit or restrict the use of a virtualized system to occasions when such a system is beneficial.

SUMMARY

An object of the invention is to address at least one of the problems mentioned above. More specifically an object of the invention is to provide a method which enables a system to switch into a protected mode, allowing a security critical function to be executed in isolation from non-security critical functions as well as other security critical functions, and to remain in the protected mode only as long as this is required by the security critical function. Mode switching is executable by way of initiating a reboot, which, upon execution, includes mode switching processes which are initiated dependent on certain pre-defined conditions. In case the number of such reboot processes is limited, which is normally the case since security critical functions are normally only required by an embedded system on certain occasions, system performance can be improved.

According to one aspect a method performed by an embedded system controlled by a CPU and capable of operating as a virtualized system under supervision of a hypervisor or as a non-virtualized system under supervision of an operating system, is provided. The method comprises execution of the embedded system in a normal mode, if no execution of any security critical function is required by the embedded system, where the normal mode execution is performed under supervision of the operating system; switching, by the operating system, execution of the embedded system from normal mode to protected mode, by handing over the execution of the embedded system from the operating system to a hypervisor, if a security critical function execution is required by the embedded system, where protected mode execution is performed under supervision of the hypervisor, and switching, under supervision of the hypervisor, the embedded system from protected mode to normal mode, when execution of the security critical function is no longer required by the embedded system.

According to an alternative embodiment, an embedded system is executed in a protected mode, in a situation where execution of a security critical function is required by the embedded system. The hypervisor switches the embedded system from protected to normal mode, by handing over the execution of the embedded system from the hypervisor to the operating system, if execution of a security critical function is no longer required by the embedded system.

By applying any of the embodiments described above, an embedded system will be able to select execution in protected mode when required by the system, and return to protected mode when no execution in protected mode, i.e. execution of the system under supervision of a hypervisor, is required any longer. By limiting the occasions when the system is executed in protected mode to occasions when this is considered necessary system performance can be improved.

Prior to performing a mode switching step, i.e. a change of mode, a reboot of the embedded system is initiated, wherein the switching step is performed as a part of execution of the reboot.

Consequently a rebooting process is configurable such that by initiating a reboot no mode switch will be executed until certain conditions pre-defined as forming part of the reboot are fulfilled.

A reboot may include reading content of a mode state register, containing a current mode state of the system, and performing a switching to the mode state registered in the mode state register.

The method typically also comprises steps of decrypting and verifying, on the basis of at least one chip unique secret key accessible from a transition cryptographic module, integrity of code associated with the hypervisor, the security critical function, and associated data if the mode state of the mode state register is set to protected mode, or prohibiting access to any of the chip unique secret key(s) if the mode state of the mode state register is set to normal mode.

According to one embodiment, the reboot is initiated by a function other than the security critical function.

Rebooting initiated by a function running on the embedded system may include an interrogation of a transition register; unlocking of the mode state register; insertion of the mode state of the transition register into the mode state register, and locking the mode state register, thereby prohibiting any modification of the mode state register until another reboot is initiated.

The reboot mentioned above is typically a soft reboot, thereby allowing a relatively quick rebooting, since the content of most volatile memories is kept during the reboot.

According to another embodiment, the reboot is initiated by a hypervisor protected unit of the embedded system, independently of the current mode state of the transition register. Such a hypervisor protected unit may e.g. be a watchdog timer.

An embedded system which is suitable to perform a method according to any of the embodiments described above may alternatively comprise two or more CPUs, one of which is having a supervising role during switching between different modes. In such a scenario, one or more CPUs may be involved in a mode switching process, such that switching from protected mode to normal mode is only executed when approved by all hypervisors, i.e. when no hypervisor is still involved in any execution of a security critical function.

According to another aspect a method according to any of the embodiments mentioned above is performed by executing a computer program, comprising computer readable code means. When such computer readable code means is executed on an embedded system controllable by a CPU it causes the embedded system to be executed in a normal mode, if no execution of any security critical function is required by the embedded system.

If execution of a security critical function is required by the embedded system, the computer readable code means instead causes the embedded system to be executed in a protected mode by instructing the operating system to switch from execution of the embedded system in normal mode to execution in protected mode, by switching execution of the embedded system from the operating system to a hypervisor, where protected mode execution is performed under supervision of the hypervisor. In addition, the computer readable code means causes the embedded system to return to execution in normal mode, by switching, under supervision of the hypervisor, the embedded system from protected mode to normal mode, when execution of the security critical function is no longer required by the embedded system.

The computer readable code means may be configured such that when executed on the embedded system it causes a reboot of the embedded system to be initiated prior to the switching step, wherein the switching step is performed as a part of execution of the reboot.

The computer readable code means may also be configured such that when executed on the embedded system it causes the system to read content of a mode state register, containing a current mode state of the system, and to perform a switching to the mode state registered in the mode state register.

Furthermore, execution of the computer readable code may cause a transition cryptographic module to decrypt and verify, on the basis of at least one chip unique secret key, the integrity of a code associated with the hypervisor the security critical function and associated code, if the mode state of the mode state register is set to protected mode, while access to the any of the chip unique key(s) is prohibited if the mode state of the mode state register is set to normal mode.

When executed on the embedded system, the computer readable code means causes a reboot to be initiated in response to receiving a request for execution of a security critical function from a function other than the security critical function. During such a reboot, the computer readable code means may, according to one embodiment, cause the embedded system to interrogate a transition register; unlock the mode state register; insert the mode state of the transition register into the mode state register, and to lock the mode state register, thereby prohibiting any modification of the mode state register until another reboot is initiated.

According to another embodiment, the computer readable code means may cause a reboot to be initiated in response to receiving a request from a hypervisor protected unit of the embedded system, independently of the current mode state of the transition register.

According to yet another aspect, a computer program product comprising computer readable means and a computer program according to any of the embodiments mentioned above is provided, wherein the computer program is stored on the computer readable means.

According to another aspect, an embedded system comprising a computer program product, comprising computer readable means and a computer program according to any of the embodiments mentioned above is also provided, wherein the computer program is stored on the computer readable means.

BRIEF DESCRIPTION OF THE DRAWINGS

The objects, advantages and effects, as well as different features of the disclosed method and arrangement will be more readily understood from the following detailed description of the disclosed embodiments when read together with the accompanying drawings, in which.

DETAILED DESCRIPTION

This document refers to a method and a mechanism for improving the performance of a system which is capable of operating either as a virtualized or a non-virtualized system by enabling the system to switch between a virtualized mode, from hereinafter referred to as a protected mode, due to the activation of a hypervisor when entering that mode, and a non-virtualized mode, from hereinafter referred to as a normal mode, where the system is executed in protected mode only when one or more security critical functions need to be executed in a secure manner, while the system is run in normal mode, without the participation of any hypervisor, upon determining that no execution of any security critical function is needed any more.

Figure 1:
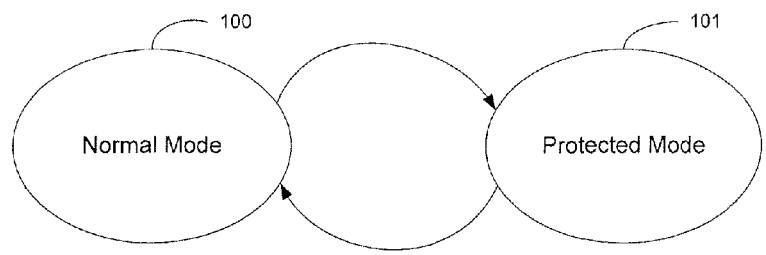
FIG. 1 is a simplified mode state scheme illustration switching between a normal mode representative of a non-virtualized state, and a protected mode, representing a virtualized state.

In order to obtain a method, where protected mode is chosen only when actually required by the system, executable code of the system is adapted to, according to FIG. 1, initiate a switch from normal mode 100 to protected mode 101 by "waking up" a dedicated hypervisor which will be supervising the execution of the system as long as the system remains in protected mode when a security critical function is requested and to switch the system back from protected mode 101 to normal mode 100, i.e. a mode operable when no security critical function is no longer required. In the former scenario the executable code, comprising code for running a hypervisor, is configured to initiate a hand over from an OS to a hypervisor, such that after the switch, system execution is performed under supervision of the hypervisor instead of the OS, which allows security critical functions to be run isolated by the hypervisor, while in the latter scenario, a handover from the hypervisor to the OS is instead initiated, such that after the switch, system execution is performed solely under supervision of the OS, without requiring any participation of any hypervisor.

Switching between modes is executed in association with execution of a boots trap process, from hereinafter referred to as a reboot, i.e. a chip reset initiated on the system, as will be described in further detail according to alternative embodiments below. When the system has been successfully rebooted in protected mode, each CPU, or CPU core, will be provided with a dedicated hypervisor, running in the most privileged mode. Later on, one of these hypervisors may, on the basis of a trigger, determine that protected mode is no longer required, and thus requesting another system reboot, typically in the form of a soft reboot, which, if successfully executed will result in the system going from protected to normal mode. If instead the system is initially rebooted in normal mode, typically no hypervisor will be running on any CPU in the system.

By applying an efficient mode switching method, enabling the time duration when the system is running in protected mode to be limited, security critical functions can be executed with very small performance impact on the system. This normally comes at the prize of soft reset which will be required whenever a security critical function is needed, or more specifically, whenever a trigger providing for a security critical function execution is launched. However, if those occasions when a security critical function execution is triggered occur relatively seldom, such an approach will be preferable performance wise compared to if the system was to be running with one or more hypervisors present at all time, i.e. if the system would be running as a virtualized system all the time.

Furthermore, the suggested approach can be implemented on a number of different embedded hardware architectures without requiring any significant modifications to the existing architecture, other than adding a few registers and functionality for enabling encryption and integrity check of code associated with the hypervisor, the security critical function and any associated data. Most of the functionality necessary for realizing the suggested method will however rely on already existing hardware and software implemented functions, as well as some adaptations to the boot code and insertion of hypervisor code enabling a dedicated hypervisor function in association with each CPU of the system.

Compared to the previously described alternative architecture built around ARM TrustZone, the major advantages of the suggested hypervisor based alternative lies in a smaller hardware Trusted Computing Base (TCB), support of multiple secure execution domains, each of which is associated with a respective security critical function, running on top of a hypervisor, and the possibilities to run on many different types of embedded architectures without any need for hardware changes or adaptations. Furthermore, hypervisors enable secure interposition and monitoring of non-trusted domains which is not possible in a "TrustZone" architecture. More information on these aspects can be found in Seshadri et al. "A Tiny Hypervisor to provide Lifetime Kernel Code Integrity for Commodity OSes", Proceedings of the 21$^{st}$ Symposium on Operating System Principles (SOSP 2007), October 2007, and in X. Chen et al, "Overshadow: A virtualization-Based Approach to Retrofitting Protection in Commodity Operating Systems", Proceedings of the 13$^{th}$ Annual International ACM Conference on Architectural Support for Programming Languages and Operating Systems (ASPLOS), March 2008.

Figure 2A:
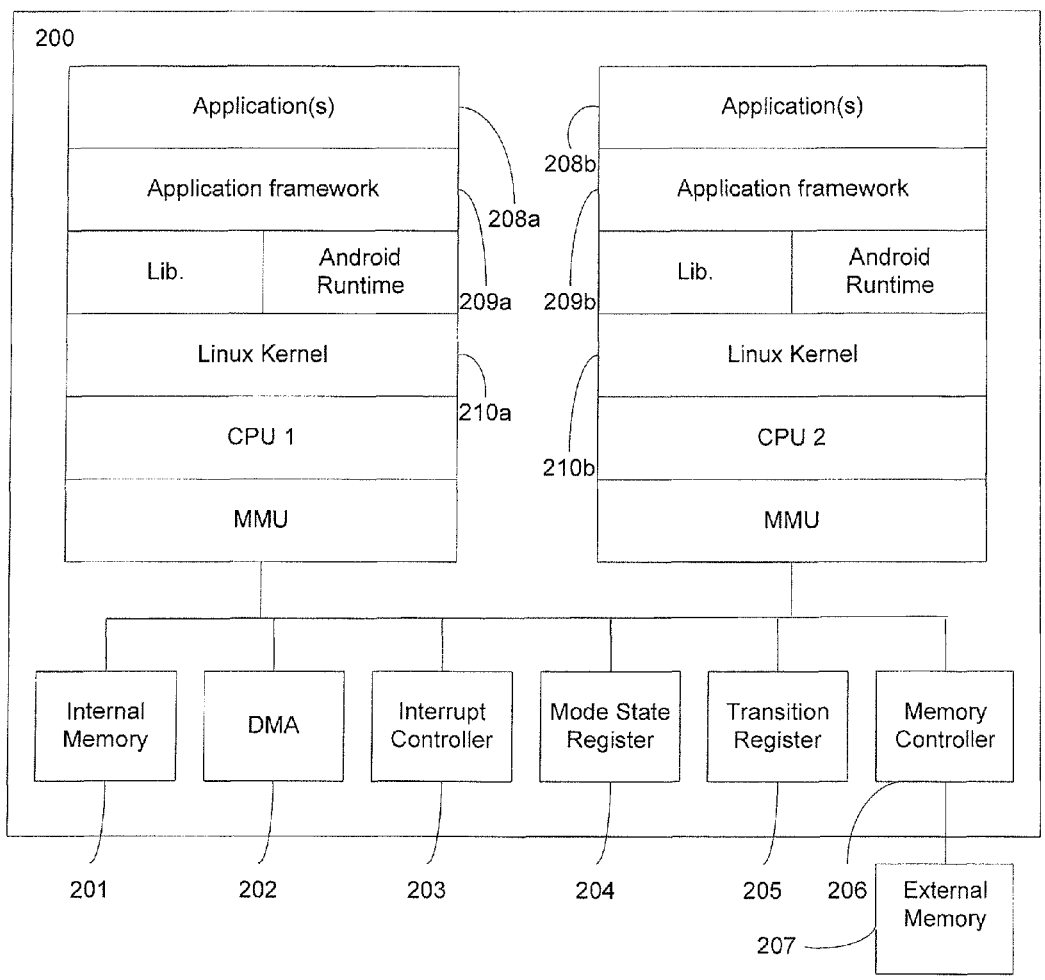
FIGS. 2a and 2b are illustrations of layered approaches of a system on which a dual-mode mechanism is executable.

FIG. 2a is an illustration of a layered approach of respective protocol stacks associated with two different CPUs, CPU 1 and CPU 2 residing on a system 200, such as e.g. a System on Chip (SoC), and arranged to manage shared internal functional units, here represented by an internal memory 201, Direct Memory Access (DMA) 202, an interrupt controller 203, a mode state register 204, a transition register 205, and a memory controller 206, as well as external sources, here represented by external memory 207.

When applying the dual-mode method suggested in this document on a system, FIG. 2a can be seen as a typical representation of normal mode operation, which describes a conventional execution of applications here represented by applications 208a, 208b, which are run on top of respective application framework 209a, 209b, and an OS, here represented by Linux Kernel 210a, 210b as in the figure, or any other OS.

Figure 2B:
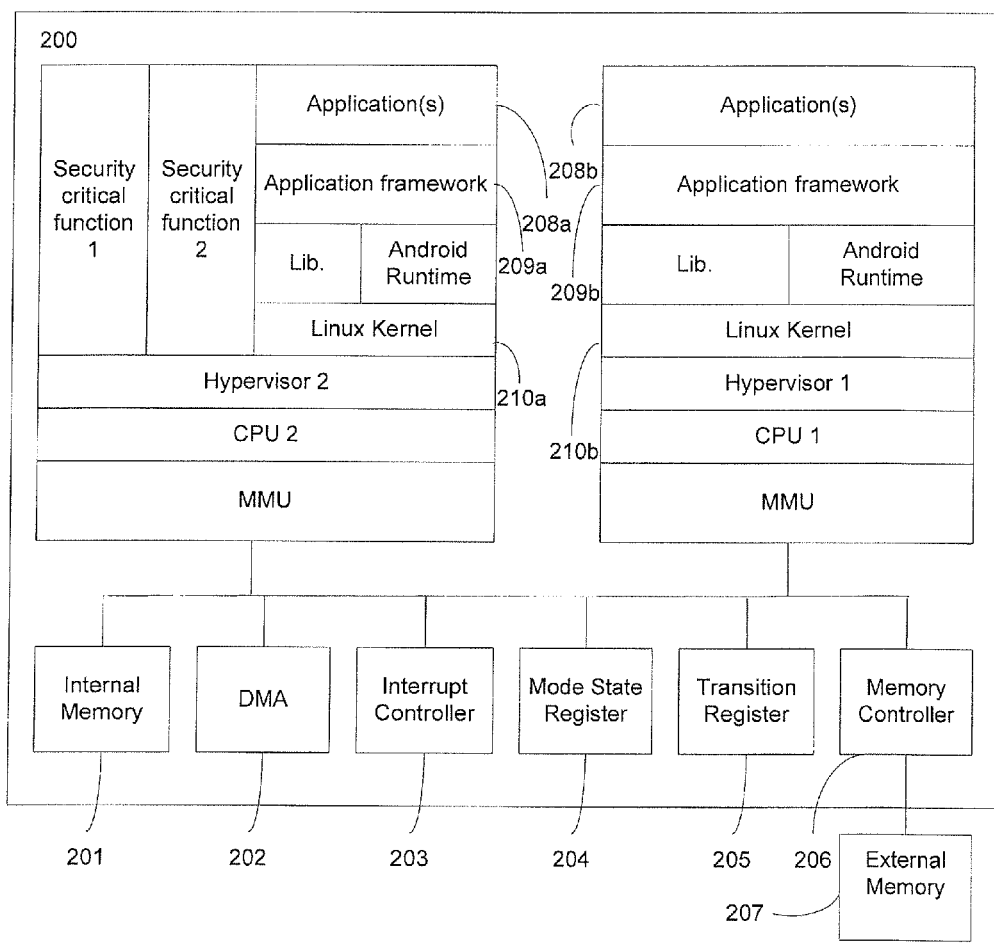

FIG. 2b is a corresponding typical representation of a system which is instead executed in protected mode. Compared to FIG. 2a, each CPU, CPU 1 and CPU 2 now have a respective hypervisor, hypervisor 1 and hypervisor 2, where the latter is typically just another instance of hypervisor 1, running on the system. In addition, the security critical functions, here represented by security critical function 1 and security critical function 2, are run in protected mode, thanks to hypervisor 2, managing these functions, these functions will be isolated and encapsulated from each other when executed under supervision of a the hypervisor, thereby enabling secure handling of security critical data and code associated with execution of each respective function.

Furthermore, hypervisor 1 and hypervisor 2 make sure that security sensitive memory utilized by security critical function 1 will not be accessible by Security critical function 2, and vice versa, and even more important, neither accessible by the OS, in the present case the Linux systems, running on CPU1 and CPU2, respectively, when the system is executed in normal mode. The hypervisors also make sure that any security sensitive peripheral utilized by any of the security critical functions are not accessible from the Linux systems. In the present example only hypervisor 2 is executing security critical functions. However, as long as the system remains in protected mode, any of the two hypervisors may execute such a service accordingly, if triggered.

In case the embedded system comprises a plurality of CPUs, the suggested mode switching method may be applied only on a subgroup of the CPUs. Which CPUs (and associated hypervisors) to involve in the switching may typically be pre-defined in the reboot code. In such a scenario, the reboot code may also comprise instructions delegating a hypervisor of a specific CPU as master hypervisor, i.e. a hypervisor coordinating the hypervisors involved in a reboot process.

Figure 3:
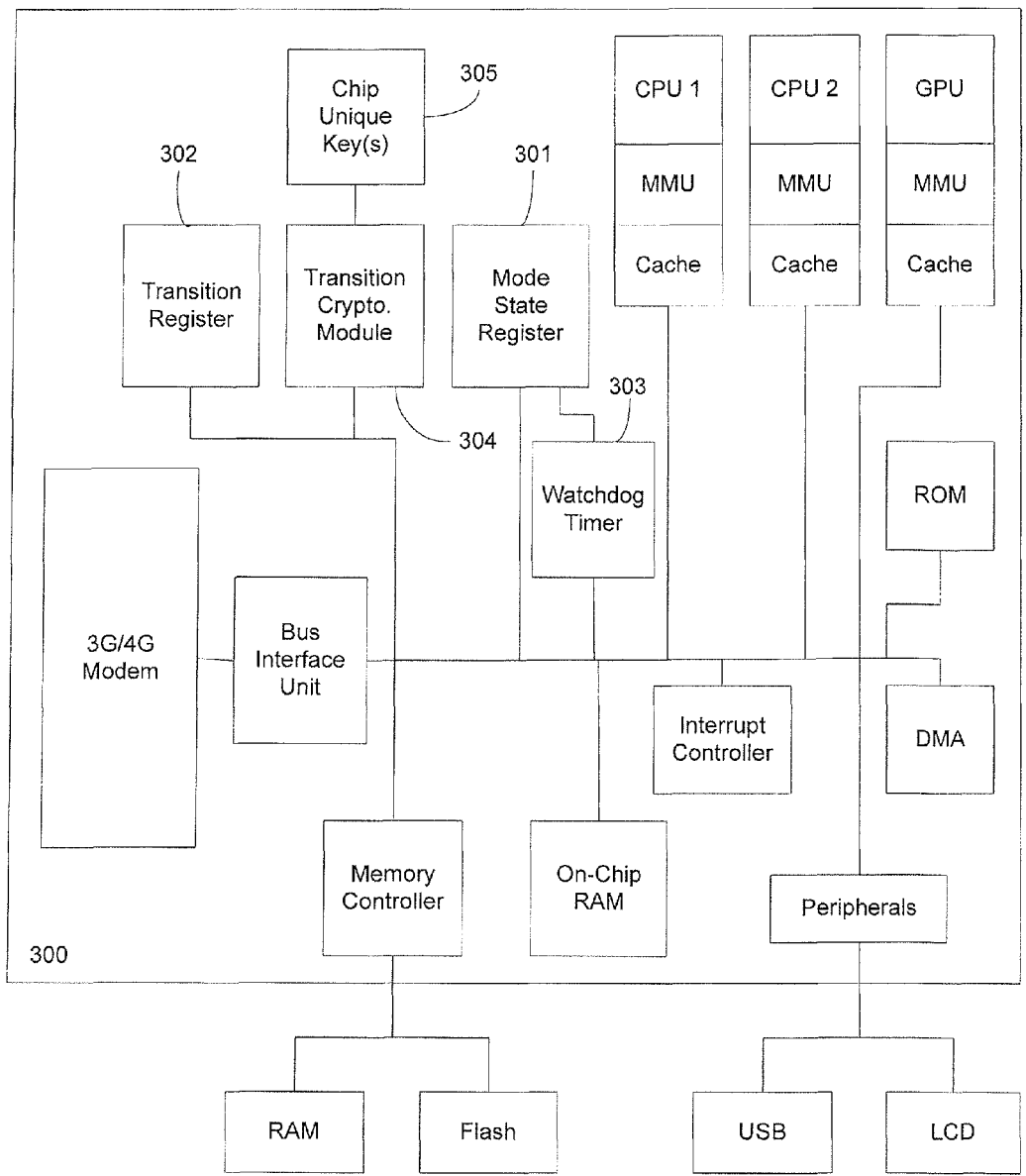
FIG. 3 is a simplified block scheme describing a System on Chip (SoC) architecture according to one embodiment.

FIG. 3 is a simplified block scheme illustrating an embedded system 300, or more specifically a SoC, which is configured to execute a method such as the one described in general terms above, and in further detail below. Although, the SoC described in FIG. 3 is configured to provide 3G/4G functionality via a 3G/4G Modem, the mechanism described in this document is applicable on any type of system, and specifically any type of embedded system, comprising one or more CPUs on which at least one security critical service may be running. The Soc is connected to various external entities, here represented by a USIM, RAM, Flash memory, USB and an LCD and, even though comprising two CPUs, CPU 1 and CPU 2, and one GPU (Graphical Processing Unit), the SoC may alternatively comprise one or even more CPUs, each being able to operate in a normal or a protected mode. In addition to conventional functional units, such as the memory controller, the interrupt controller, the ROM, and the DMA of FIG. 3, the Soc is also provided with functional units especially adapted for the suggested mode switching mechanism.

The described SoC comprises two different registers, typically configured as on-ship volatile memories. One of these registers is referred to as a mode state register 301, which is configured to hold the present mode of the Soc, i.e. protected or normal mode. Boot code executed during the reboot process is typically configured such that the content of the mode state register 301 can only be changed at an early stage in the reboot process. More specifically the boot code is configured such that during the reboot process it locks the mode state register 301 before the system is about to be handed over to either a hypervisor or an operating system. The mode state register 301 may typically be locked by activating a sticky bit, which can later be unlocked by the trigger triggering a reboot.

Which mode to reboot into, and consequently, which mode to set the mode state register 301 to, may also be determined by the reboot code. In case of a full hardware reset, typically referred to as a cold reset, a cold bootstrap or a cold reboot, a preferred default mode value will be given by the reboot configuration. More specifically, whether or not the system is to be prepared for handling security critical functions instantly upon a cold reset, is determined on the boot code and its reboot configuration.

Different from a cold reboot, soft reset, also referred to as a warm boots trap or warm reboot, most volatile memory content is kept, thereby resulting in a reset procedure which is much faster than during a full, cold reset. During a soft reset the value to be put in the mode state register 301 is determined by the value given in another special purpose register, here referred to as a transition register 302. The transition register 302 is used by higher layer software to signal the desired mode to the boot code at soft reset.

When running in protected mode, the hypervisor will have control over security critical functions, i.e. software functions running on the system, and associated processing sensitive data, such as e.g. cryptographic keys, username, passwords, private information, and will be able to protect the system from illegal access to memory units holding data associated with such a function.

This can be achieved by using the normal Memory Management Unit (MMU) or Memory Protection Unit (MPU) as the hypervisor is the only software running in the system that has the privilege to configure, i.e. set access domains and restrictions, to the MMU or MPU in the system. If applicable, additional hardware protection support, such as e.g. I/O MMU, can be used as well to protect access to security critical peripherals, such as e.g. smart cards, security modules, sensitive external memories, as the hypervisor will be the only software running in the system that has the privilege to configure the I/O MMU, if such an entity is present.

The MMUs or MPUs are also used for assuring that when running in protected mode, a state change to normal mode, executed via a soft reset, can only be initiated by a hypervisor or a hypervisor protected unit, i.e. a unit which has its memory protected by a hypervisor running on the system, which can be used to force the system into protected mode. One example of a hypervisor protected unit is a watchdog timer (WDT). A WDT is a timer which is commonly used in embedded systems for making the system self-reliant, by providing an option to initiate a reboot in case of software malfunctioning.

A conventional WDT implemented on an embedded system automatically detects software anomalies and reset a CPU if detected. The WDT is based on a counter that counts down from an initial value. The software of the embedded system selects the counter's initial value and restarts it periodically. If the counter reaches zero before the software restarts it, the software is presumed to be malfunctioning and the CPU is rebooted. A WDT may be implemented either as a standalone hardware unit external to the CPU, or included within the same chip as the CPU. A conventional WDT is described in Murphy et al "Watchdog Timers" Embedded Systems Programming, October 2001, pp 79-80.

In case the embedded system is in protected mode, the WDT may be used for rebooting the system if it erroneously is stuck in protected mode.

In case the embedded system is in normal mode, a WDT may also be used for forcing the system into protected mode at regular intervals, thereby providing for certain security critical function execution. In the latter case the WDT is connected to the mode state register, such that at pre-defined time intervals it sets the mode state register to protected mode and initiates a reboot. Thereby the system will be rebooted into protected mode, irrespective of the current content in the transition register.

FIG. 3 comprises a WDT 303 which is connected to the mode state register 301 such that it can only be reset when the mode state register 301 is in protected mode. Consequently, the WDT will repeatedly reset while in protected mode. If during execution of the WDT 303, the WDT register (not shown) cannot be kept alive, i.e. a reset request is written to the WDT 303 before it has reached a zero value, the WDT 303 responds by issuing a platform reset signal to one or more CPUs which results in a rebooting into protected mode, where a respective hypervisor will be present for each CPU involved in the process.

The interval for forcing the system into protected mode can be determined by setting the counter of the WDT into an appropriate value and is typically pre-configured in the reboot code. Code executed in normal mode will not have the right to enter this value. This can only be done by code executed in protected mode or by the reboot code.

In addition, the SoC 300 comprises a transition cryptographical module 304 (Transition crypto Module), which has access to one or several chip unique keys 305 that are used for decryption and for checking the integrity of code associated with the respective one or more hypervisor, security critical function and associated data, before the hypervisor and the security critical function is loaded, typically into the chip internal or external RAM. By having the mode state register connected to the transition crypto module 304, usage of any chip unique keys 305 when the mode state register 301 is set to normal mode, can be prevented by the transition crypto module 304 e.g. through maintaining a state control machine.

In order to illustrate how the components described above, in particular the two registers, are used in association with executing a reboot process, three different scenarios will be described in further detail below.

The general principle of switching between normal mode and protected mode and, thus, between execution of a system under supervision of an OS or a hypervisor, respectively, and vice versa, will first be described. It is to be understood that the rebooting processes described below which is configured to execute the described switching between the different modes only describe one possible way of rebooting the system and that it is obvious for anybody skilled in the art to apply alternative reboot sequences in accordance with the basic principles described above.

Figure 4:
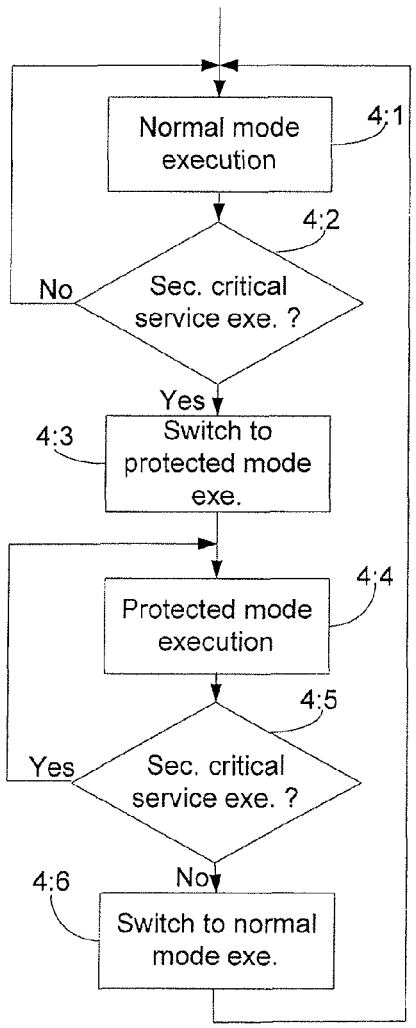
FIG. 4 is a flow chart illustrating a method for switching between different normal and protected mode according to one scenario.

FIG. 4 is a flow chart illustrating a method according to a first embodiment where system execution is initiated in a normal mode, as indicated in a first step 4:1. As illustrated with a next step 4:2, the execution in normal mode continues as long as no security critical function is required, i.e. until a function other than the required security critical function invokes a switch to protected mode, or until the system is forced into protected mode by a hypervisor protected unit. In the latter case, execution of a specific security critical function is typically also triggered simultaneously by the hypervisor protected unit.

If, however, a security critical function is required by the system, a process for switching from normal to protected mode is executed, typically by initiating a system soft reboot, which, if successful, results in a hand over or a switching over of system execution run by an OS to execution of the system by a hypervisor. If the system comprises a plurality of CPUs, a hand over from an OS to a respective hypervisor will be executed for each CPU. A mode switch preparing for security critical function execution is indicated with another step 4:3.

Subsequent to a successful transfer from normal mode to protected mode, the execution of the system is continued in protected mode, as indicated in a step 4:4. According to subsequent step 4:5, execution in protected mode is however only continued as long as the security critical function, or functions in case more than one security critical function is running on the system, is/are required by the system. More specifically, when no security critical function is required to run on the system any longer, another switch back to normal mode, as indicated in step 4:6 may be initiated. At this stage no hypervisor will be needed by the system and after security critical data has been removed from the memories of the system, system execution will commence in a conventional manner, under supervision of the OS, until yet another mode switch is triggered at the system.

Figure 5:
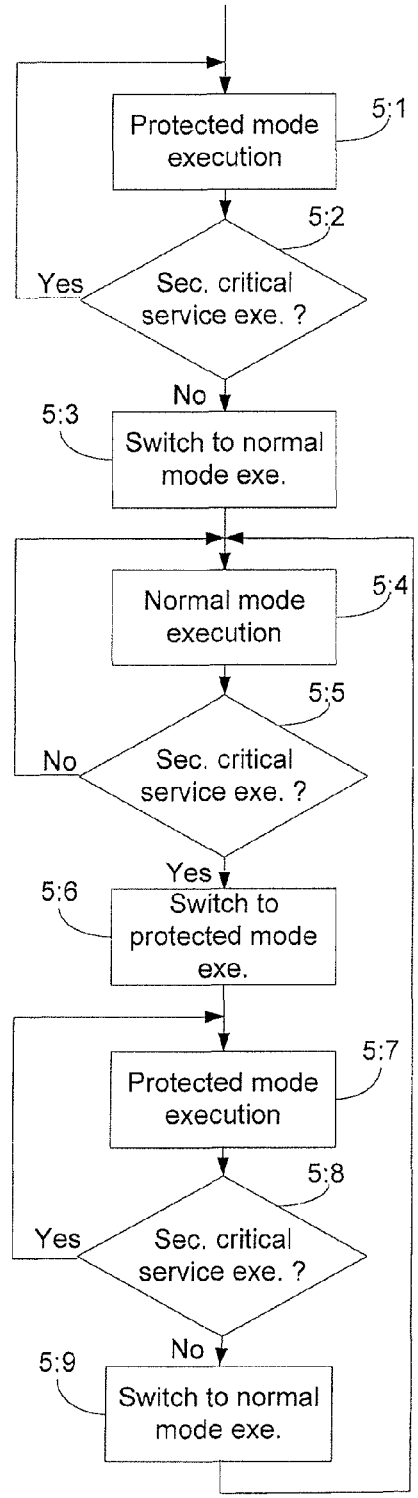
FIG. 5 is another flow chart illustrating a method for switching between normal and protected mode according to another scenario.

FIG. 5 is another flow chart, illustrating a scenario which is instead initiated by system execution in a protected mode, as indicated in a first step 5:1, which has to be maintained only as long as required by the one or more security critical functions, as indicated in subsequent step 5:2. Following steps 5:4-5:9 correspond to steps 4:1-4:6 in FIG. 4. The scenario executed according to FIG. 5 may e.g. be initiated by executing a cold reboot, i.e. a full hardware reset of the system, where, by default, the system is set to start at protected mode execution.

In order to further clarify how a transition between modes, can be executed in an efficient way, different mode switching scenarios will be described in more detail below with reference to FIGS. 6a,6b, 7, 8a, and 8b, respectively.

Figure 6A:
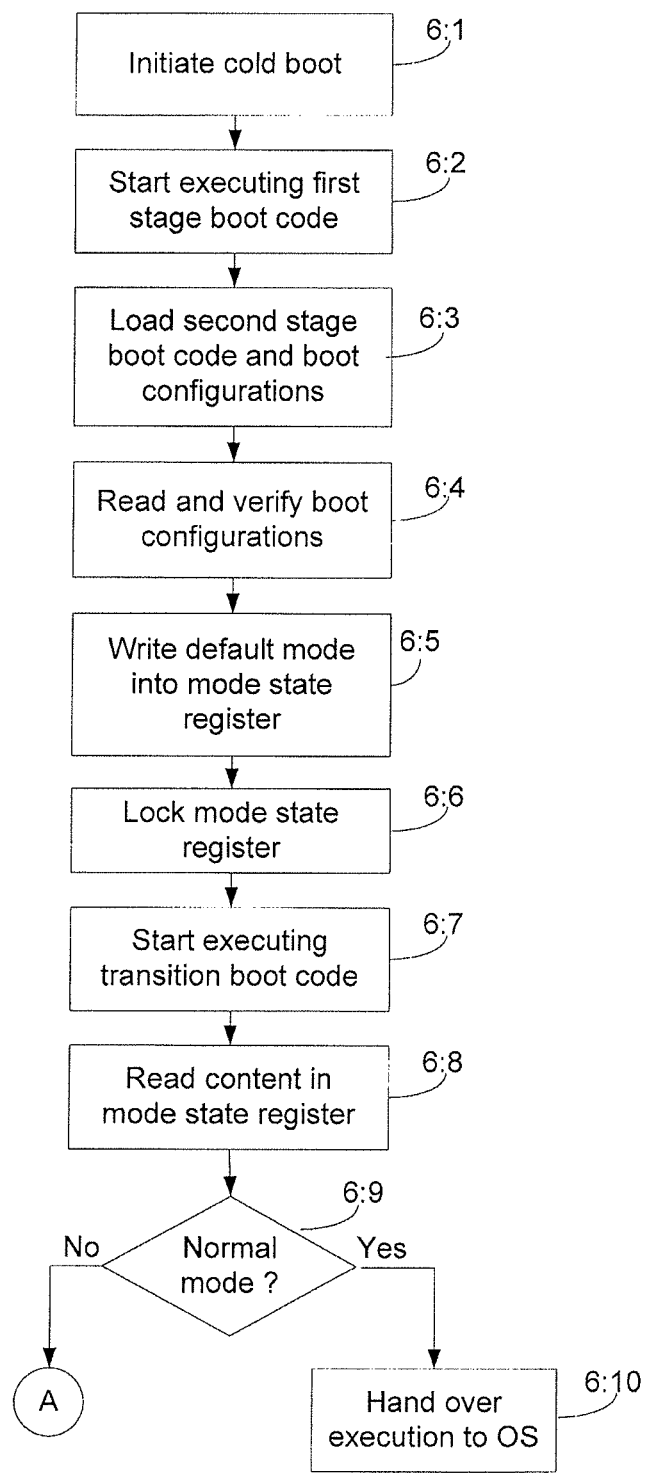
FIGS. 6a and 6b are associated flow charts illustrating how switching between normal and protected mode and vice versa may be executed during a cold reboot execution.
Figure 6B:
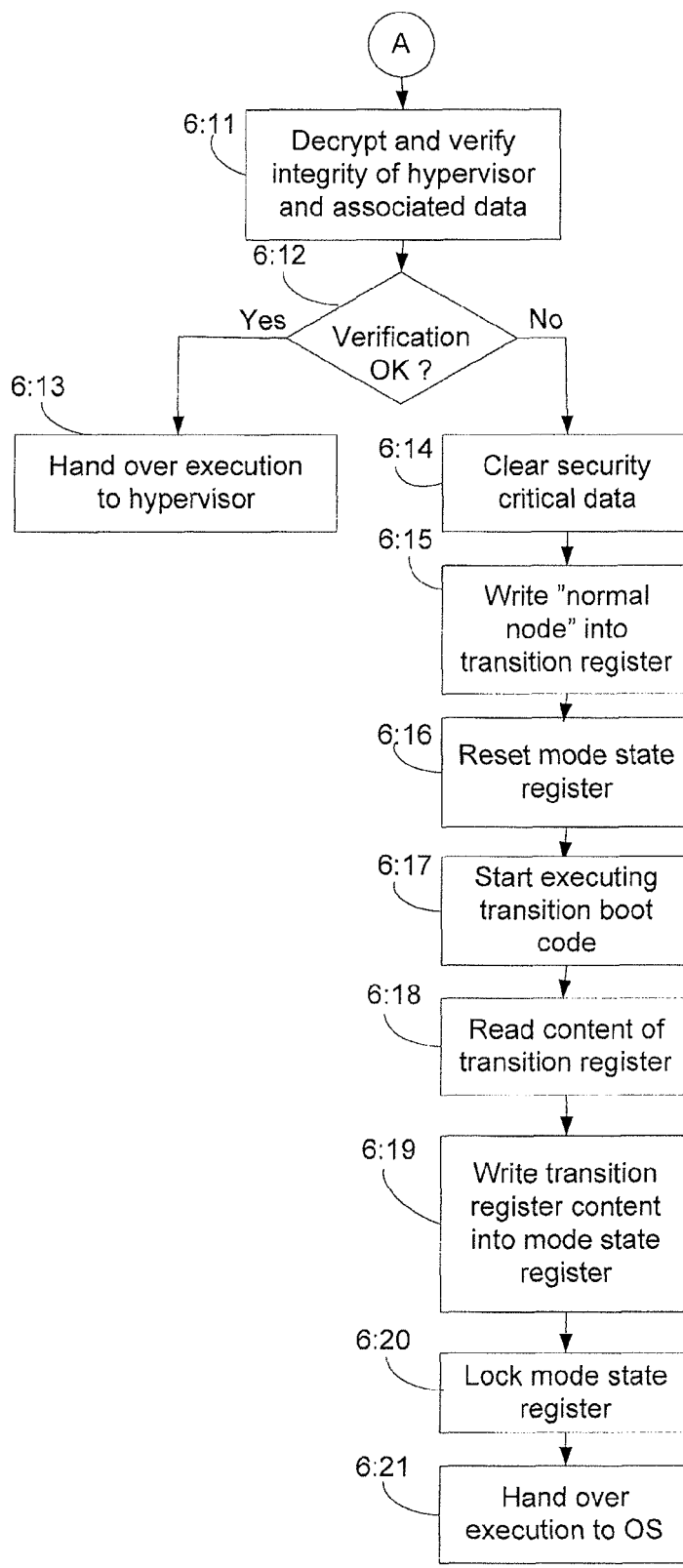

A cold reboot, configured to apply the mode switching concept described above may be executed according to the flow chart of FIG. 6a and, if required, also FIG. 6b. Such a process can be triggered by any kind of cold reboot activation of a system, here indicated with step 6:1 of FIG. 6a. Such a trigger also unlocks the mode state register, i.e. the mode state register which is initially locked is not unlocked until a reboot has been initiated, thereby enabling a change of the content of this register from the start of the reboot, until the register is one again locked. A cold reboot comprises execution of boot code, which typically comprise an initial first part, here referred to as a first stage boot code, as indicated in a step 6:2, and a second part, here referred to as a second stage boot code, which is typically loaded by the first stage boot code together with relevant reboot configurations, as indicated in another step 6:3, and read and verified in a subsequent step 6:4. At least the second stage boot code is integrity protected and the reboot configurations are typically protected with a public key signature corresponding to a public key stored in a write protected memory, such as e.g. a ROM, or a hardware register, such as e.g. an e-fuse register.

In a next step 6:5 the first stage boot code writes a default mode, i.e. normal mode or protected mode, depending on what mode has been pre-defined in the reboot configurations, into the mode state register, after which the mode state register is locked, as indicated in a subsequent step 6:6. The mode state register will remain locked, such that its content cannot be changed, until another cold or soft reboot is initiated.

In a subsequent step 6:7 execution of a part of the second stage boot code, which is here referred to as a transition stage boot code, is initiated, typically after boot code representing one or more intermediate boot stages (not shown) have been executed. In a next step 6:8, the transition stage boot code reads the content of the mode state register, i.e. the default value previously written, or inserted, into the mode state register, by the first stage boot code in step 6:5.

If the mode state register indicates a "normal mode", i.e. the system is considered not to require execution of any security critical function at system hardware reset, as indicate with the left branch following step 6:9, the transition stage boot code launch an OS, indicated in the reboot configurations, and hands over execution to that OS, as indicated in a step 6:10, i.e. execution of the system continues in normal mode. If instead "protected mode" is registered as the default mode in the mode state register the left branch following step 6:9, denoted "A" in FIG. 6a and described in more detail with reference to FIG. 6b will instead commence.

Process "A" will start by the transition boot code executing decryption and verification of the integrity of code associated with a hypervisor, or a plurality of hypervisors, in case of a plurality of CPUs as well as hypervisor associated code and associated data, i.e. data and code necessary for realizing the one or more hypervisors on the system, and as indicated in a step 6:11.

If the verification of the hypervisor/s executed in step 6:11 is successful, the transition boot code hands over execution to a hypervisor, which will be running in the most privileged mode, as indicated in a step 6:13, i.e. execution continues in protected mode.

In case of a plurality of CPUs, the transition boot code fetches hypervisor code and hands over execution to one hypervisor per CPU, or in case only a subgroup of CPUs are to be involved, e.g. due to pre-configurations in the reboot code, to hypervisors of that subgroup.

If, on the other hand, the verification executed in step 6:11 fails, the process commences with the right branch following step 6:12, providing a fallback process, allowing the system to recover, in case of failure to hand over to a hypervisor, or a plurality of hypervisors, which will instead result in an execution of the system by the OS pre-defined for the system, according to a process which will now be described below.

In a step 6:14, the transition boot code clears all hypervisor associated data and code. In a next step 6:15, the transition boot code writes "normal mode" into the transition register, after which it initiates a soft reboot, which is described with following steps 6:16-6:20, which is terminated by switching the execution to the OS, as indicated in step 6:21.

As already mentioned above, the soft reboot is a reboot of the system where considerable content of volatile memories of the system is kept, thereby providing for a relatively quick reboot process, without requiring reloading of all programs and data from the non-volatile memories of the system, as required during a cold reboot. The soft reboot comprise resetting the mode state register, as indicated with step 6:16, starting execution of transition boot code, as indicated in step 3:17, reading the content of the transition register by the boot code, as indicated with step 6:18, writing the mode state of the transition register, i.e. in the present case writing "normal mode" into the mode state register, as indicated with step 6:19, and locking the mode state register as indicated in step 6:20, before the boot code hands over the execution of the system to the OS, all according to the mode registered in the mode state register, as indicated in a step 6:21:

One big advantage with the proposed method is that it will efficiently enable the system to stop execution in protected mode when this is no longer necessary. When the system is up and running in protected mode and no security critical functions are any longer needed by the system the system will typically be configured to initiate a transition from protected to normal mode. Such a transition may be triggered by a function which originally has initiated a switch to protected mode, typically through a hypercall sent to the hypervisor, initiating a reboot. Alternatively, an interrupt provided from a hypervisor protected unit may request a switch to normal mode.

A process where, as a prerequisite, an embedded system is supposed to be running in a protected mode, according to one embodiment, will now be described with reference to the flow chart of FIG. 7. In a first step of FIG. 7, step 7:1 a hypervisor is made aware that a security critical function is no longer required and as a consequence it halts the security critical function, and relevant memory regions of the system are cleared by either wiping out all security sensitive data associated with the security critical function and the hypervisor or by copying the data back to a non-volatile integrity and confidentiality protected storage. Such a procedure is indicated with a step 7:2.

The present case is illustrating a scenario involving only one CPU and one associated hypervisor. In case of two or more CPUs, each CPU, or each CPU of a pre-defined subgroup of CPUs, will be having an associated hypervisor, and in case of a switch to normal mode, all other hypervisors are informed of the ongoing mode switch. If all hypervisors acknowledge the required switch, the hypervisor, here referred to as the master hypervisor, can continue the initiated process immediately. If not acknowledged by all other hypervisors, e.g. because a security critical function is still running on another CPU, the master hypervisor may enter a special wait mode, where it remains until it receives any missing acknowledgement, i.e. all hypervisors are prepared to leave protected mode.

In a next step 7:3, the hypervisor, or in case of a plurality of hypervisors, the master hypervisor, writes "normal mode" into the transition register, and in subsequent steps 7:4-7:8, a soft reboot, corresponding to the steps 6:16-6:20 in FIG. 6b, is initiated. In accordance with FIG. 6b, the soft reboot of FIG. 7 is terminated by handing over execution to the OS, as indicated with step 7:9.

When instead the system is up and running and one or more security critical functions are required, a transition from normal to protected mode will commence. Such a procedure according to one embodiment will now be described with reference to the flow chart of FIG. 8a continuing according to FIG. 8b.

Figures 7, 8A:
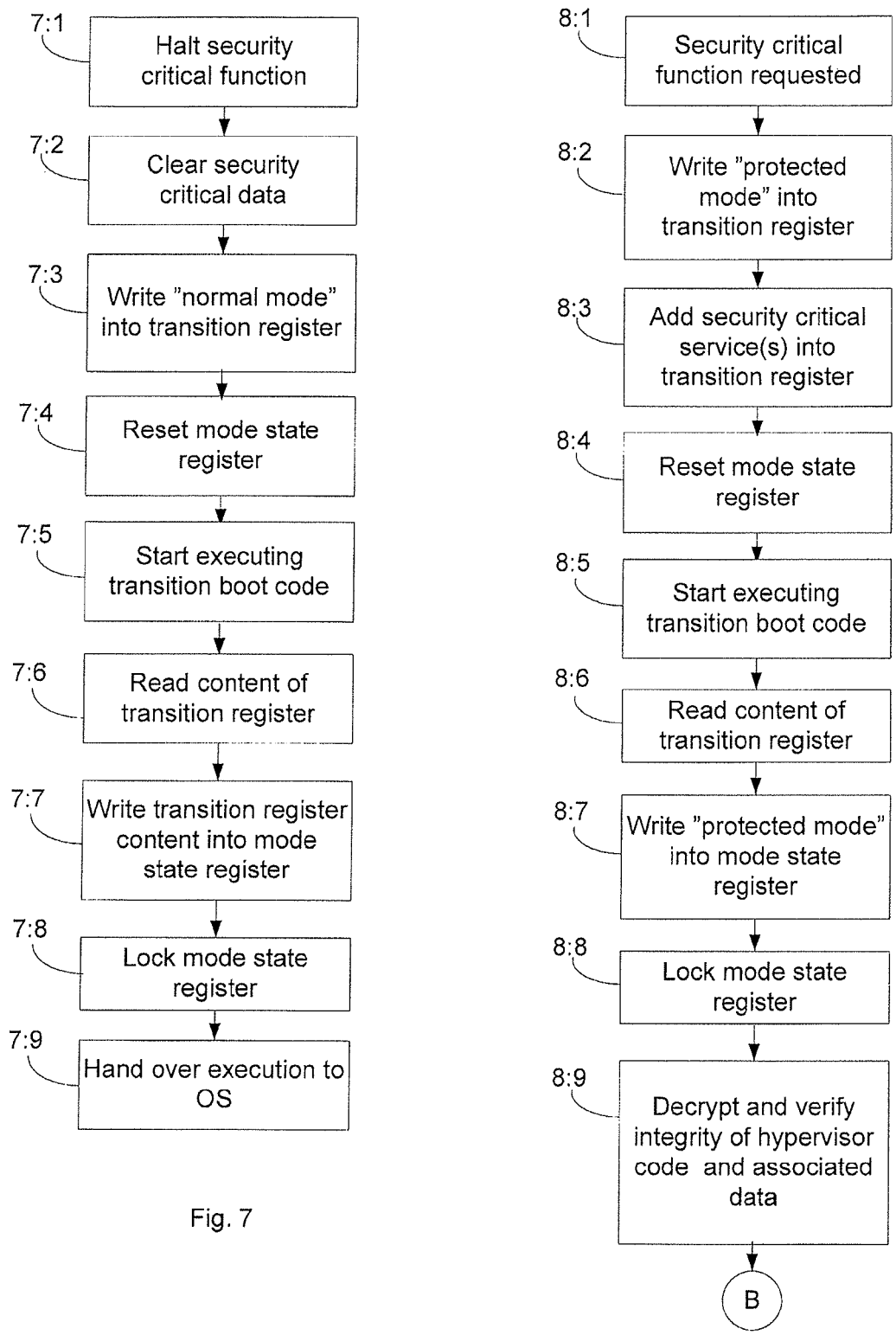
FIG. 7 is yet another flow chart illustrating how a switch from protected mode to normal mode may be executed according to one embodiment.
FIGS. 8a and 8b are flow charts illustrating how a switch from normal to protected mode and vice versa may be executed according to another embodiment.

In a step 8:1 of FIG. 8a a security critical function is requested in the system presently being executed in normal mode from a function requiring security critical function execution, which results in the requesting function, as indicated in a step 8:2. Alternatively a hypervisor protected unit, writes "protected mode" into the transition register. In addition, information on the requested security function, or functions, and its associate parameters may be provided to the transition register, as indicated in a step 8:3, such that a respective security critical function can be identified, followed by a soft reboot, initiated at step 8:4 and resulting in any of the branches of FIG. 8b.

In order to provide for the required mode change, the boot code executes a soft reboot by first resetting (and thus unlocking) the mode state register, as indicate in a step 8:4, and then initiates execution of a transition boot code, as indicated in another step 8:5. The transition boot code is then configured to read the current content of the transition register, as indicated in a step 8:6, and to write the content of the transition register, in this case "protected mode" into the mode state register, as indicated in step 8:7, before the register is locked, as indicate in step 8:8.

In a subsequent step 8:9, the transition boot code decrypts and verifies the integrity of code associated with the hypervisor, or hypervisors, and associated data, typically by activating the transition crypto module and using one or more chip unique keys, as mentioned above, thereby protecting the loading of the hypervisor by the reboot code.

Figure 8B:
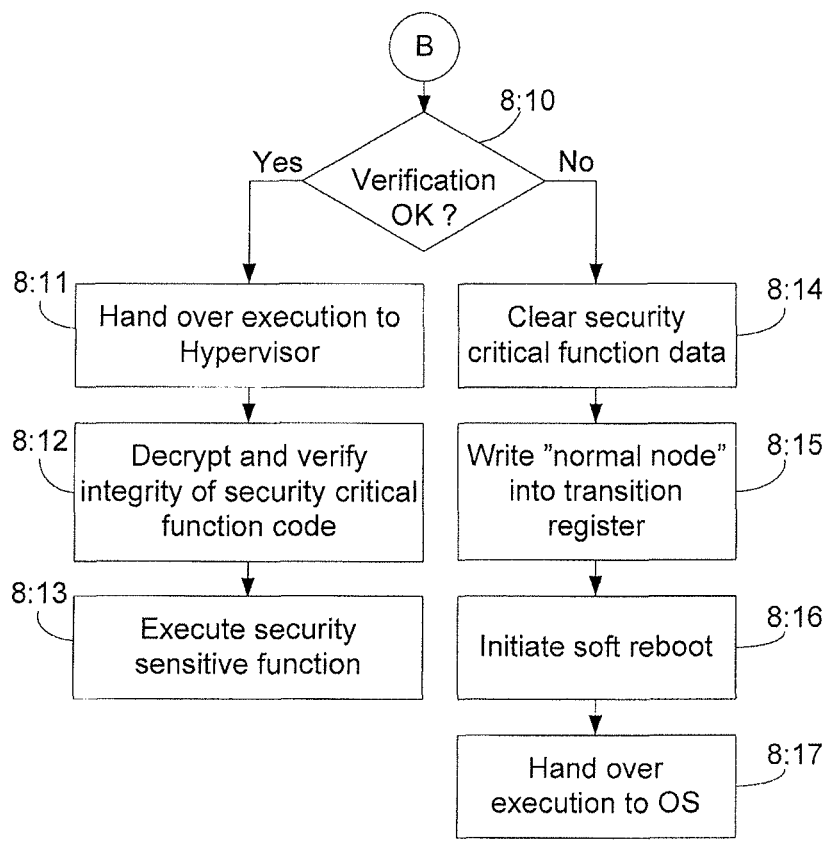

If the verification process performed in step 8:9 is successful, as indicated with the left branch following step 8:10 of FIG. 8b, the transition boot code switches to protected mode execution, by handing over the execution of the system from the OS to the hypervisor, as indicated in step 8:11. After the switch has been completed and the hypervisor is up and running, the hypervisor will decrypt and verify security critical function code, as indicated in step 8:12, thereby ensuring protection of code associated with the security critical function in a way which corresponds to the protection of the hypervisor code executed in step 8:9. Once a successful decryption and verification of the security critical function code is determined, the security critical function can be executed, as indicated in step 8:13. When execution of the security critical function is completed, data created during the execution is stored on a protected memory area, from where it is accessible to the security critical function in association with subsequent executions of the function.

If instead the verification is not successful in step 8:10, a fall back procedure terminating with the transition boot code handing over execution to the OS according to steps 8:14-8: 17, which corresponds to steps 6:14-6:21 of FIG. 6b, is instead executed.

The mode switching method described above may be implemented into an embedded system which is controllable by a CPU as a computer program, comprising computer readable code means which when executed on the embedded system causes the embedded system to switch between modes in response to triggers caused either by a security critical function or by a hypervisor protected unit according to any of the embodiments described above. Therefore, the computer program may be described as constituting different functions accessible and executable by each respective CPU.

Figure 9:
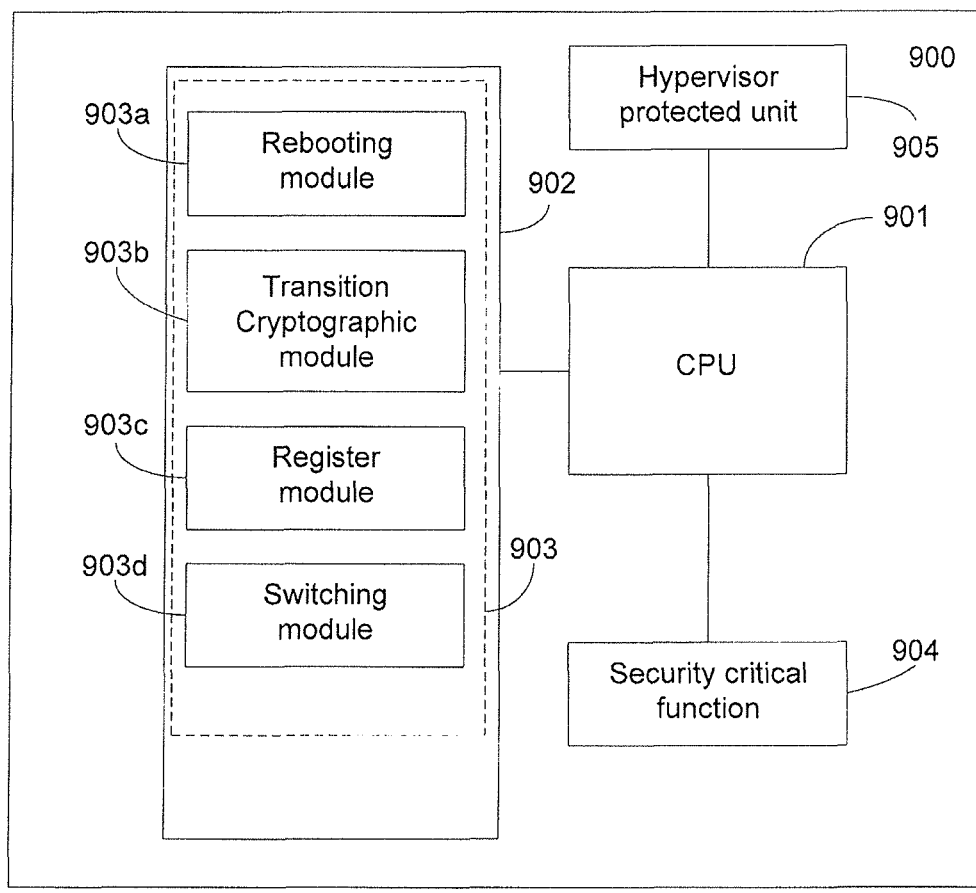
FIG. 9 is an illustration of a set of functions configured to execute a mode switching mechanism.

FIG. 9 is a simplified illustration of an arrangement 900 forming part of an embedded system, such as e.g. the embedded system/SoC 300 of FIG. 3. Arrangement 900 comprises a CPU 901, which could e.g. represent any of CPU 1 or CPU 2 of FIG. 3. CPU 901 is connected to a computer program product 902 carrying a computer program 903, where the computer program product 902 comprises a computer readable medium on which the computer program 903 is stored. The computer program 903 of FIG. 9 is configured as computer program code structured in a plurality of computer program modules 903a-903d.

A rebooting module 903a is configured to execute a rebooting process on demand, i.e. in response to any of the trigger alternatives mentioned above. A transition cryptographic module 903b, corresponding to module 403 in FIG. 3, is configured to decrypt and check the integrity of any security critical function code and data associated with a respective security critical function execution as well as hypervisor code in association with a switch to protected mode. A register function 902 is configured to manage the updating of the registers used during a reboot execution, e.g. the mode state register 301 and the transition register 302 of FIG. 3, which is performed in association with a reboot execution, and a switching function 903 which configured to execute a switching between modes as part of the ongoing reboot execution.

The computer program product 902 may be a ROM. Alternatively it may be any of an EEPROM (Electric Erasable Programmable ROM), a RAM (Random-access memory), or a Flash memory. It is also to be understood that the computer program 903 is not limited to the configuration described above, but that it could alternatively be configured by another combination of modules as long as the described functionality and method is executable. FIG. 9 also illustrates a security critical function 904, which may e.g. correspond to any of security critical function 1 or security critical function 2 of FIG. 2b, and a hypervisor protected unit 905, which may e.g. correspond to WDT 303 of FIG. 3, where any of security critical function 904 and the hypervisor protected unit 905 are capable of triggering mode switch by initiating a reboot execution.

It is to be understood that the choice of, as well as naming of the entities, such as e.g. the transition register, the transition cryptographic module and the mode state register, are only for exemplifying purpose, and that other alternative ways of configuration as well as naming of entities are possible.

In addition, it is to be understood that units and modules described in this disclosure are to be regarded as logical entities, and not with necessity as separate physical entities. Alternatively, one or more of the modules described above, such as e.g. the transition cryptographic module 304, 903b may be configured at least partly as hardware circuits.

The invention claimed is:

1. In a system comprising an embedded system capable of operating as a virtualized system under supervision of a hypervisor or as a non-virtualized system under supervision of an operating system, a method comprising the steps of:

executing the embedded system in a normal mode, if no execution of any security critical function is required by the embedded system, where the normal mode execution is performed under supervision of the operating system;

switching, by the operating system, execution of the embedded system from normal mode to protected mode, by handing over the execution of the embedded system from the operating system to the hypervisor, in response to a determination that a security critical function execution is required by the embedded system, where protected mode execution is performed under supervision of the hypervisor;

switching, under supervision of the hypervisor, the embedded system from protected mode to normal mode, when execution of the security critical function is no longer required by the embedded system; and decrypting and verifying, on the basis of at least one chip unique secret key accessible from a transition cryptographic module, the integrity of code associated with the hypervisor, the security critical function, and associated data, if the mode state of the mode state register is set to protected mode, or prohibiting access to any chip unique secret key if the mode state of the mode state register is set to normal mode.

2. The method according to claim 1, comprising a further step of initiating a reboot of the embedded system prior to performing said switching step, wherein said switching step is performed as a part of execution of said reboot.

3. The method according to claim 2, wherein said reboot comprises:
reading content of a mode state register, containing a current mode state of the system, and
performing said switching to the mode state registered in said mode state register.

4. The method according to claim 2, wherein the reboot is initiated by a function other than the security critical function.

5. The method according to claim 4, comprising the initial rebooting steps of:
interrogating a transition register;
unlocking a mode state register;
inserting a mode state of the transition register into the mode state register, and
locking the mode state register.

6. The method according to claim 5, wherein the reboot is a soft reboot.

7. The method according to claim 2, wherein the reboot is initiated by a hypervisor protected unit of the embedded system, independently of a current mode state of a transition register.

8. The method according to claim 7, wherein the hypervisor protected unit is a watchdog timer.

9. The method according to claim 1, wherein the embedded system comprises two or more CPUs, one of which is having a supervising role during said switching between different modes.

10. A computer program comprising computer-readable code which when executed on an embedded system capable of operating as a virtualized system under supervision of a hypervisor or as a non-virtualized system under supervision of an operating system causes the embedded system to:
be executed in a normal mode, if no execution of a security critical function is required by the embedded system, where the normal mode execution is performed under supervision of the operating system;
be executed in a protected mode by instructing the operating system to switch from execution of the embedded system in normal mode to execution in protected mode, by switching the execution of the embedded system from the operating system to a hypervisor, if execution of a security critical function is required by the embedded system, where protected mode execution is performed under supervision of the hypervisor, and
return to execution in normal mode, by switching, under supervision of the hypervisor, the embedded system from protected mode to normal mode, when execution of said security critical function is no longer required by the embedded system, wherein
the computer program further comprises computer-readable code which when executed on the embedded system causes a transition cryptographic module to decrypt and verify, on the basis of at least one chip unique secret key, integrity of code associated with the hypervisor, the security critical function, and associated data, if the mode state of the mode state register is set to protected mode, while access to any chip unique secret key is prohibited if the mode state of the mode state register is set to normal mode.

11. The computer program according to claim 10, comprising computer-readable code which when executed on the embedded system causes a reboot of the embedded system to be initiated prior to said switching step, wherein said switching step is performed as a part of execution of said reboot.

12. The computer program according to claim 11, comprising computer-readable code which when executed on the embedded system causes the system to read content of a mode state register, containing a current mode state of the system, and to perform a switching to the mode state registered in said mode state register.

13. The computer program according to claim 11, comprising computer-readable code which when executed on the embedded system causes a reboot to be initiated in response to receiving a request for execution of a security critical function from a function other than the security critical function.

14. The computer program according to claim 13, comprising computer-readable code which when executed on the embedded system causes the system to:
interrogate a transition register;
unlock a mode state register;
insert a mode state of the transition register into the mode state register, and
lock the mode state register.

15. The computer program according to claim 14, comprising computer-readable code which when executed on the embedded system causes a reboot to be initiated in response to receiving a request from a hypervisor protected unit of the embedded system, independently of the current mode state of the transition register.

16. A computer program product comprising computer-readable means and a computer program according to claim 10, the computer program being stored on the computer-readable means.

17. An embedded system comprising a computer program product comprising computer-readable means and a computer program according to claim 10, the computer program being stored on the computer-readable means.

* * * * *

UNITED STATES PATENT AND TRADEMARK OFFICE
CERTIFICATE OF CORRECTION

PATENT NO. : 8,713,567 B2  
APPLICATION NO. : 13/070958  
DATED : April 29, 2014  
INVENTOR(S) : Gehrmann Page 1 of 1

It is certified that error appears in the above-identified patent and that said Letters Patent is hereby corrected as shown below:

In The Specification

In Column 2, Line 52, delete "hypervizor" and insert -- hypervisor --, therefor.

In Column 12, Line 25, delete "3:17," and insert -- 6:17, --, therefor.

In Column 12, Line 32, delete "6:21:" and insert -- 6:21. --, therefor.

In Column 14, Lines 29-30, delete "register function 902" and insert -- register function 903c --, therefor.

In Column 14, Line 34, delete "switching function 903" and insert -- switching function 903d --, therefor.

In Column 14, Line 38, delete "(Random-access memory)," and insert -- (Random-Access Memory), --, therefor.

Signed and Sealed this
Twelfth Day of May, 2015

Michelle K. Lee
*Director of the United States Patent and Trademark Office*